(12) United States Patent
Song

(10) Patent No.: US 11,030,824 B2
(45) Date of Patent: Jun. 8, 2021

(54) AUTOMATIC COLOR HARMONIZATION

(71) Applicant: COLORO CO., LTD, Shanghai (CN)

(72) Inventor: Hu Song, Shanghai (CN)

(73) Assignee: COLORO CO., LTD, Shanghai (CN)

( * ) Notice: Subject to any disclaimer, the term of this patent is extended or adjusted under 35 U.S.C. 154(b) by 0 days.

(21) Appl. No.: 16/624,603

(22) PCT Filed: Jun. 22, 2017

(86) PCT No.: PCT/CN2017/089549
§ 371 (c)(1),
(2) Date: Dec. 19, 2019

(87) PCT Pub. No.: WO2018/232964
PCT Pub. Date: Dec. 27, 2018

(65) Prior Publication Data
US 2020/0175775 A1    Jun. 4, 2020

(51) Int. Cl.
*G06T 19/20* (2011.01)
*G06F 3/0482* (2013.01)
*G06F 3/0484* (2013.01)

(52) U.S. Cl.
CPC ............ *G06T 19/20* (2013.01); *G06F 3/0482* (2013.01); *G06F 3/04845* (2013.01);
(Continued)

(58) Field of Classification Search
CPC ............ G06T 19/20; G06T 2219/2012; G06F 3/0482; G06F 3/04845; G06F 3/04847;
(Continued)

(56) References Cited

U.S. PATENT DOCUMENTS

| 2002/0036786 A1* | 3/2002 | Kondo | H04N 1/603 |
|---|---|---|---|
| | | | 358/1.9 |
| 2005/0062737 A1 | 3/2005 | Wang et al. | |
| 2006/0022994 A1 | 2/2006 | Hussie | |

FOREIGN PATENT DOCUMENTS

CN    103489224 A    1/2014

OTHER PUBLICATIONS

MPL Colormaps (https://bids.github.io/colormap/ published as of Jun. 13, 2015 (Year: 2015).*

(Continued)

*Primary Examiner* — William A Beutel
(74) *Attorney, Agent, or Firm* — McDonnell Boehnen Hulbert & Berghoff LLP

(57) ABSTRACT

An embodiment may involve obtaining a three-dimensional color model containing hue, lightness, and chroma dimensions. The color model may represent each of at least one thousand distinct colors as unique points within the hue, lightness, and chroma dimensions. The embodiment may involve displaying, in accordance with the color model, a rotatable three-dimensional representation of the unique points. The embodiment may further involve receiving a selection of a first point of the unique points and a selection of a second point of the unique points. The embodiment may involve, in response to receiving the selection of the first point and the selection of the second point, displaying, in accordance with the color model, a rotatable three-dimensional representation of the first point, the second point, a line connecting the first point and the second point, and a subset of the unique points that are within a particular radius of the line.

15 Claims, 7 Drawing Sheets

(52) U.S. Cl.
CPC .. *G06F 3/04847* (2013.01); *G06T 2219/2012* (2013.01); *G06T 2219/2016* (2013.01)

(58) Field of Classification Search
CPC ....... G06F 3/04815; G01J 3/528; G01J 3/462; G01J 3/52; H04N 1/6061; G09G 5/026; G09G 2320/0666; G09G 2354/00; G09G 5/003; G09G 5/06
See application file for complete search history.

(56) References Cited

OTHER PUBLICATIONS

Smith, et al., "A Better Default Color map for Matplotlib | SciPy 2015 | Nathaniel Smith and Stefan van der Walt", video time 19:08, also published at https://www.youtube.com/watch?time_continue=25&v=xAoljeRJ3IU&feature=emb_logo (Year: 2015).*
International Search Report and Written Opinion for Int. App. No. PCT/CN2017/089549, dated Mar. 22, 2018.

* cited by examiner

AUTOMATIC COLOR HARMONIZATION

CROSS REFERENCE TO RELATED APPLICATIONS

The present application is a U.S. National Phase Application pursuant to 35 U.S.C. § 371 of International Application No. PCT/CN2017/089549 filed Jun. 22, 2017, which is herewith incorporated by reference into the present application.

TECHNICAL FIELD

This disclosure relates to an automatic color harmonization.

BACKGROUND

Designers, when assembling color palettes for clients, may choose colors from a color book containing thousands of colors. When designers use these color books, they rely on their experience and trained eye to choose colors. A designer may first choose one or two primary colors and then choose secondary colors that are complementary to the primary color(s). While choosing complementary colors is difficult for a designer with a trained eye, it may be near-impossible for a lay person. This is because choosing complementary colors is subjective and not intuitive; colors may appear differently to different people. Further, colors may change appearance based on their relative surroundings. For example, colors may appear brighter or more vivid when placed next to other, duller colors. This relative and subjective nature of complimentary colors makes designers' jobs difficult when they are tasked with choosing the right complimentary colors for given primary colors.

Designers may be tasked with choosing more than one complimentary color for given primary colors when assembling a color palette for a particular client. A color palette, ideally, contains colors that are all complementary with one another. When all of the colors are complementary, color harmony is achieved. Achieving color harmony with a large number of colors is difficult because every color selected must be complementary not only to the primary colors, but every other secondary color chosen.

Using a color book to manually choose colors and build a color palette may be time consuming and may ultimately prove futile if the designer is unable to choose a wide and accurate enough color palette for the desired application. While computerized tools to create color palettes exist, these tools are limited to searching palettes defined by others, or creating a palette from photographs or drawings.

SUMMARY

As previously discussed, designers and ordinary users may have difficulties choosing color palettes that achieve color harmony (i.e. all of the colors in the palette are complementary with one another). Thus, it may be desirable for designers to have a tool to automatically compile a color palette in which all of the colors are harmonized to primary colors. A color tool may allow a designer to choose two primary colors, and then display a number of complementary colors to the designer, all of which are in harmony with one another.

The color tool may have functions, such as a graphical user interface (GUI), to present a designer with a three-dimensional (3D) color model representing available colors to the designer as unique points. The number of unique points in the model may range from about 1,000 points that represent the colors that are most distinguishable by the human eye, to 1.6 million points that represent a much larger color spectrum. The 3D model may be rotatable to allow the designer to view the model at any angle. Further, the color tool may allow the designer to select any of the unique points on the 3D model to establish a first point and a second point. The color tool may then display a line connecting the first point and the second point, and may in turn display a subset of unique points representing colors that are in harmony with the colors represented by the first and second points.

For example, a designer may be tasked with developing a color palette for a new upscale restaurant. Traditionally, the designer may have visited the space and chosen primary colors from which to develop the color palette. Next, the designer may arbitrarily select complementary colors based on his or her subjective view of the colors. The designer may add these colors to the color palette and repeat this process until the palette is complete. This process may be labor intensive and inefficient due to the manual aspect of searching physical color books to choose the complementary colors. With this traditional approach, the margin of error or subjective bias may overshadow the final work product, resulting in a displeasing color palette for the client.

Using the color tool described herein, the designer may again select two colors from which to base the color palette. However, the color tool may then, via a graphical user interface, display available complementary colors that harmonize with the two chosen colors. This may allow the designer to choose from this reduced subset of colors with confidence that any of these colors achieves harmony with the originally chosen two colors. This may result in an objectively harmonized color palette for the client.

Accordingly, a first example embodiment may be a computing device, which may include a processor, memory, and a display unit. The display unit may be configured to represent a graphical user interface, and the processor may be configured to execute program instructions stored in the memory to perform operations. The operations may involve obtaining a three-dimensional color model containing three color dimensions (for example, hue, lightness, and chroma dimensions). The color model may represent each of at least one thousand distinct colors as unique points within the three dimensions (e.g. the hue, lightness, and chroma dimensions). The operations may further involve displaying, by way of the user interface and in accordance with the color model, a rotatable three-dimensional representation of the unique points. The operations may involve receiving, by way of the user interface, a selection of a first point of the unique points and a selection of a second point of the unique points. Finally, the operations may involve, in response to receiving the selection of the first point and the selection of the second point, displaying, by way of the user interface and in accordance with the color model, a rotatable three-dimensional representation of the first point, the second point, a line connecting the first point and the second point, and a subset of the unique points that are within an envelope defined based on the line, for example within a particular radius of the line.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a method may be carried out to perform each of the operations of the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DESCRIPTION

Figure 1:
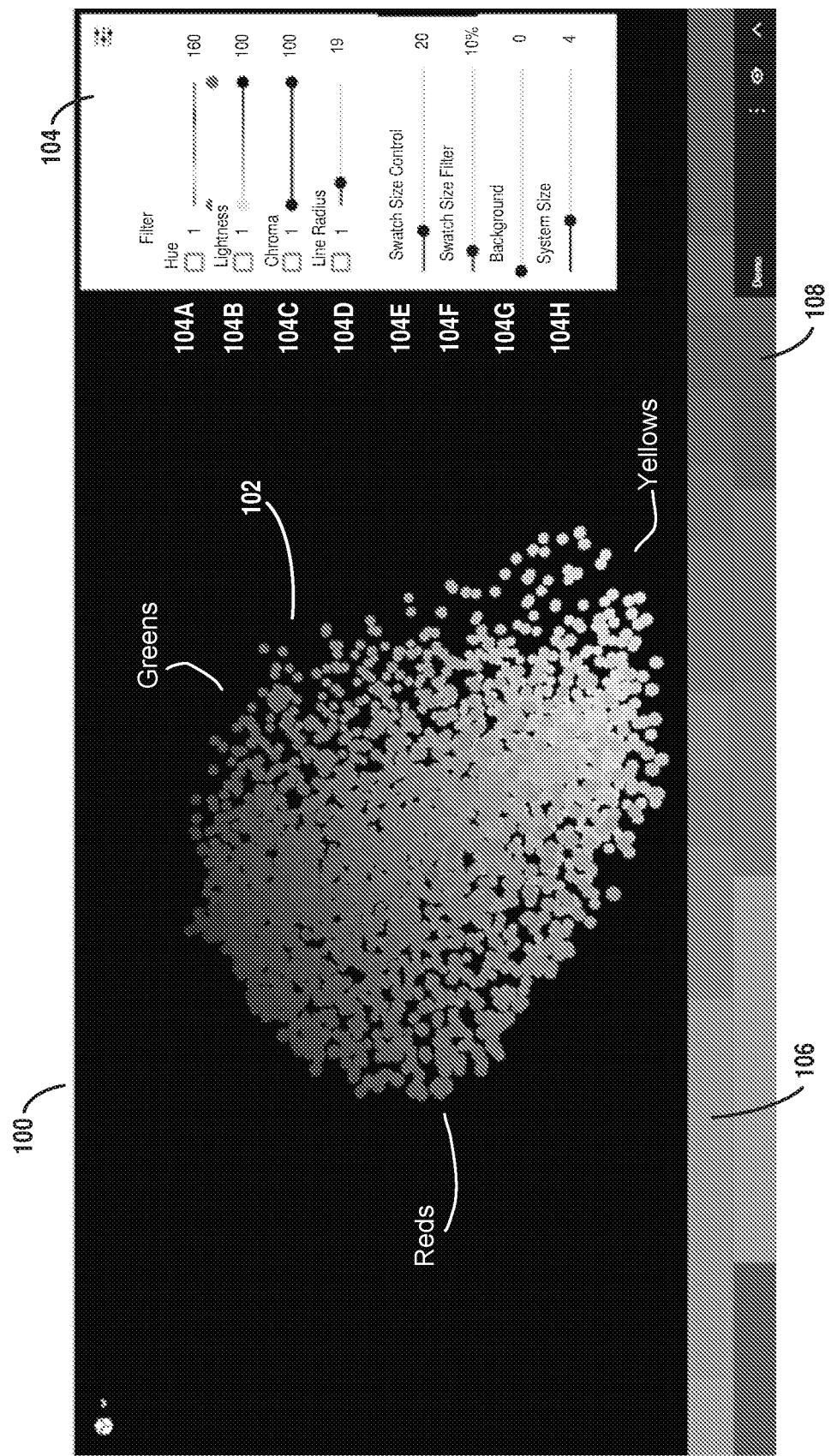
FIG. 1 illustrates a color tool involving a 3D color model, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A designer is generally an individual hired to design certain aspects of homes, office spaces, automobiles, websites, and so on to achieve an aesthetically pleasing look for residents, patrons, or clients. A designer may be employed by a firm or may be an independent contractor hired for specific tasks.

To develop a design strategy, designers typically use physical books full of color and fabric swatches. After visiting a particular space, the designer may scour these books in order to develop an appropriate color palette. This process of finding and choosing complementary colors may be time consuming and labor intensive. Some designers may use conventional software applications to assist in choosing colors and compiling color palettes, but these applications simply allow the designer to select colors from a standard color wheel.

While designers may benefit from custom software applications designed to automatically display harmonious colors, a lay person or general user may also benefit from the ability to design color palettes without specialized training. The goal of such software would be to improve the time-intensive and error-prone process of selecting a color palette, resulting in a quickly generated harmonious color palette. In particular, a possible color space of thousands to over one million points simply provides too many options for humans to process. Therefore, computer implementation is required to focus a user's attention on harmonious colors, and to allow selection from these colors for a palette.

In the embodiments herein, a computerized color tool involving automatic harmonious color display is introduced to intelligently assist users in the selection of color palettes. The color tool involves a graphical user interface that displays a 3D model representation of the color spectrum in hue, lightness, and chroma dimensions. The color spectrum is represented by unique points corresponding to each distinct color.

The color tool may allow a user to select a first point representing a first color and a second point representing a second color from any of the unique points in the 3D model. Then, the color tool may allow a user to view the subset of points along a line connecting the first point and second point. This subset of points represents the colors that are in harmony with the first and second colors. The subset of points may be within an envelope defined based on the line, for example within a particular radius of the line, and thus may be represented by a cylinder or tube through the color space, with the line as its axis. The radius may be perpendicular to the line, or may extend from the line in all directions (such that the cylinder has hemi-spherical ends).

Further, the radius may be adjustable within the graphical user representation of the color tool. As the radius increases, the subset of points generally grows. As the radius decreases, the subset of point generally shrinks.

The color tool may allow a user to rotate the 3D model around axes associated with the hue, lightness, and chroma dimensions to view the model at different angles. This may be beneficial because the user might only be able to view certain colors from one viewing angle and other colors from other viewing angles.

The color tool may support the ability to select and save points out of the subset of unique points to a digital color palette. This may allow the user to quickly compile a color palette from the available colors represented by the subset of unique points with objective certainty that the colors will be in harmony with the first and second selected colors.

The color tool may support the ability to view the unique points not selected by the designer as dimmed background elements of the graphical user interface. This may allow the designer to see where on the 3D model the line or cylinder falls without being inundated with having to view the points in full size and color.

Other features, functionality, and advantages of the color tool may exist. This description is for the purpose of example and is not intended to be limiting.

As an example of the color tool, a user may desire to create a website. Traditionally, if the user is a lay person with no specialized training in color design, the user may be required to either hire a professional designer or arbitrarily pick colors for the website that are not aesthetically pleasing.

According to the embodiments described herein, the user may first, via a GUI displaying a 3D color model including unique points representing the color spectrum, select two of the unique points from which to design the website color palette. In an example, the user may a first and second point representing the colors maroon and powder blue, respectively. Then, via the GUI, the user may choose to display a subset of points that represent associated colors between the two selected points (e.g., shades of red, purple, and blue). This subset of points may be represented as a line or cylinder. The subset of points may also be represented in the GUI by a swatch bar. Next, the user may select one or more of the points of the subset of points, which may add the associated color to the color palette. Once all of the desired points are selected, the user may export the color palette for printing or sharing.

The following embodiments describe architectural and operational aspects of an example computerized color tool, as well as the features and advantages thereof.

II. Example Color Metrics

When selecting and viewing colors, it is desirable to use a 3D model representing the color spectrum. This 3D model may be plotted on axes corresponding to metrics (otherwise referred to herein as dimensions) such as hue, lightness, and chroma. These metrics represent the fundamentals of color theory and allow a user to intuitively see how colors interrelate with one another by changing certain values or traversing each of the three axes.

Any of the colors in the visible color spectrum can be represented on a scale from 1-100 for lightness and chroma, and 1-160 for hue. These values can be used to determine the composite location of a particular color on the 3D model. For example, the color "Brick Red" is represented by the numerical value (1, 66, 29), with 1 corresponding to the hue, 66 corresponding to the chroma, and 29 corresponding to the lightness.

A. Hue

Hue represents color as the human eye perceives, which is dependent on the wavelength of light being displayed. Hue can be subjective based on the individual viewing the color or shade. For example, two people may view a particular hue differently, even though they are observing the same image. Hue may be represented on a scale of 1-160, although different scales and representations of hue may exist. In an example, the hue of red may be 1, while the hue of blue may be 120.

B. Lightness

Lightness is a representation of variation in the perception of a color or a color space's brightness. Lightness may be represented on a scale from 1-100, with a value of 1 representing a nearly black image and a value of 100 representing the pure color.

C. Chroma

Chroma is determined by a combination of light intensity and how much it is distributed across the spectrum of different wavelengths. Chroma is also referred to as the saturation of an image. The highest chroma value is achieved by using just one wavelength at a high intensity. One can lower a color's chroma by adjusting the lightness.

For example, "Fire Engine Red" may represent the purest red, with a chroma value of 100. In another example, "Brick Red" may have a chroma value of 66, which represents a "duller" version of the hue red.

III. Example Color Tool

FIG. 1 illustrates a color tool involving a 3D color model. The color tool may include graphical user interface 100. Graphical user interface 100 includes color model 102, control box 104, swatch bar 106, and color palette 108.

Color model 102 may include a 3D spatial plot of each distinct point on the color spectrum. The color spectrum may include a predefined set of distinct colors represented as unique points. The distinct color set may range anywhere from 1,000 to 1.6 million colors. Color model 102 may be rotatable in graphical user interface 100 about three axes with hue, lightness, and chroma dimensions. Although not shown in FIG. 1, the user can select two points represented in color model 102 to create a color line. The color line may be used to identify the harmonious colors that lie in between two selected points.

Control box 104 may include controls to manipulate color model 102, such as hue filter 104a, lightness filter 104b, chroma filter 104c, line radius filter 104d, swatch size control 104e, swatch size filter 104f, background filter 104g, and system size filter 104h. The controls in control box 104 may be represented by a slider, radio buttons, text boxes, or other suitable GUI elements.

Hue filter 104a controls the range of hues displayed in color model 102. The defined range of hues may be between 1 and 160. In an example, if a user desires to only view colors ranging from red to yellow, the user may adjust hue filter 104a to only display hue values 1 to 40.

Lightness filter 104b controls the range of lightness displayed in color model 102. The lightness range may be between 1 and 100. In an example, if a user desires to only view darker shades of a particular hue in color model 102, the user may adjust lightness filter 104b to only display a lightness range of 10 to 30.

Chroma filter 104c controls the range of chroma or saturation displayed in color model 102. The chroma range may be between 1 and 100. In an example, if a user desires to only view pure or high chroma in a particular image, the user may adjust chroma filter 104c to only display a chroma range of 80-100.

Line radius filter 104d controls the length of the radius from the color line. The line radius ranges between 1 and 100. In an example, if a user desires to show only colors that have a close association with the two selected points, the user may adjust line radius filter 104d to only display a line radius of 10.

Swatch size control 104e controls the size of swatch bar 106. The swatch bar 106 size corresponds to the number of swatches displayed on the screen. For example, if swatch size control 104e is set to 20, then 20 swatches may be displayed on swatch bar 106.

Swatch size filter 104*f* controls the color variation between colors on swatch bar 106. The variation ranges between 1-100%. For example, if swatch size filter 104*f* is set to 10%, then each color on swatch bar 106 may vary by 10%.

Background filter 104*g* controls the background color of color model 102. The background color ranges between 0-100, with 0 representing a black background and 100 representing a white background. This may be beneficial to a user trying to select a specific color, because it may allow the user to view the color model 102 on a variety of different background colors.

System size filter 104*h* controls the size of the 3D model in color model 102. The size scale ranges from 1-15. In an example, if the user wants to enlarge color model 102, the user can increase system size filter 104*h* to a value between 4 and 6.

Swatch bar 106 may contain a subset of the distinct colors associated with the first point, the second point, and the subset of the unique points located approximately along the color line between these points (not show in FIG. 1). The amount of swatches on swatch bar 106 directly correlates to the value selected in swatch size control 104*e*. The variation of colors depicted on swatch bar 106 is controlled by swatch size filter 104*f*. Swatch bar 106 may also support allowing a user to select any color from swatch bar 106 and add it to color palette 108. Swatch bar 106 may automatically update according to the values set in any of hue filter 104*a*, lightness filter 104*b*, chroma filter 104*c*, line radius filter 104*d*, swatch size control 104*e*, swatch size filter 104*f*, background filter 104*g*, and system size filter 104*h*. For example, if a user adjusts hue filter 104*a* to remove a certain range of hues, swatch bar 106 may automatically update to remove the omitted range of hues.

Color palette 108 represents the user's final selections of colors. Color palette 108 may contain a selection of distinct colors associated with the first selected point, second selected point, and the subset of unique points on the color line. The user may select the distinct colors for color palette 108 in a variety of ways. For example, a user may select a point in color model 102 and, from a drop down menu that is not depicted, add the color to the color palette. In another example, the user may add a point to color palette 108 by selecting the color in swatch bar 106 and choosing, from a drop down menu that is not depicted, to add it to color palette 108. Color palette 108 may also support exporting the color selections to an external file for printing or sharing.

Color palette 108 may be arranged according to the order of selection of the distinct colors associated with the first point, the second point, and the subset of the unique points therebetween. In an example where a user wants four colors for a particular color palette 108, color palette 108 may be arranged such that the first color corresponds to the first selected point, the second color corresponds to the second selected point, the third color corresponds to a third selected point in either the color model 102 or swatch bar 106, and the fourth color corresponds to a fourth selected point in either the color model 102 or swatch bar 106.

Figure 2:
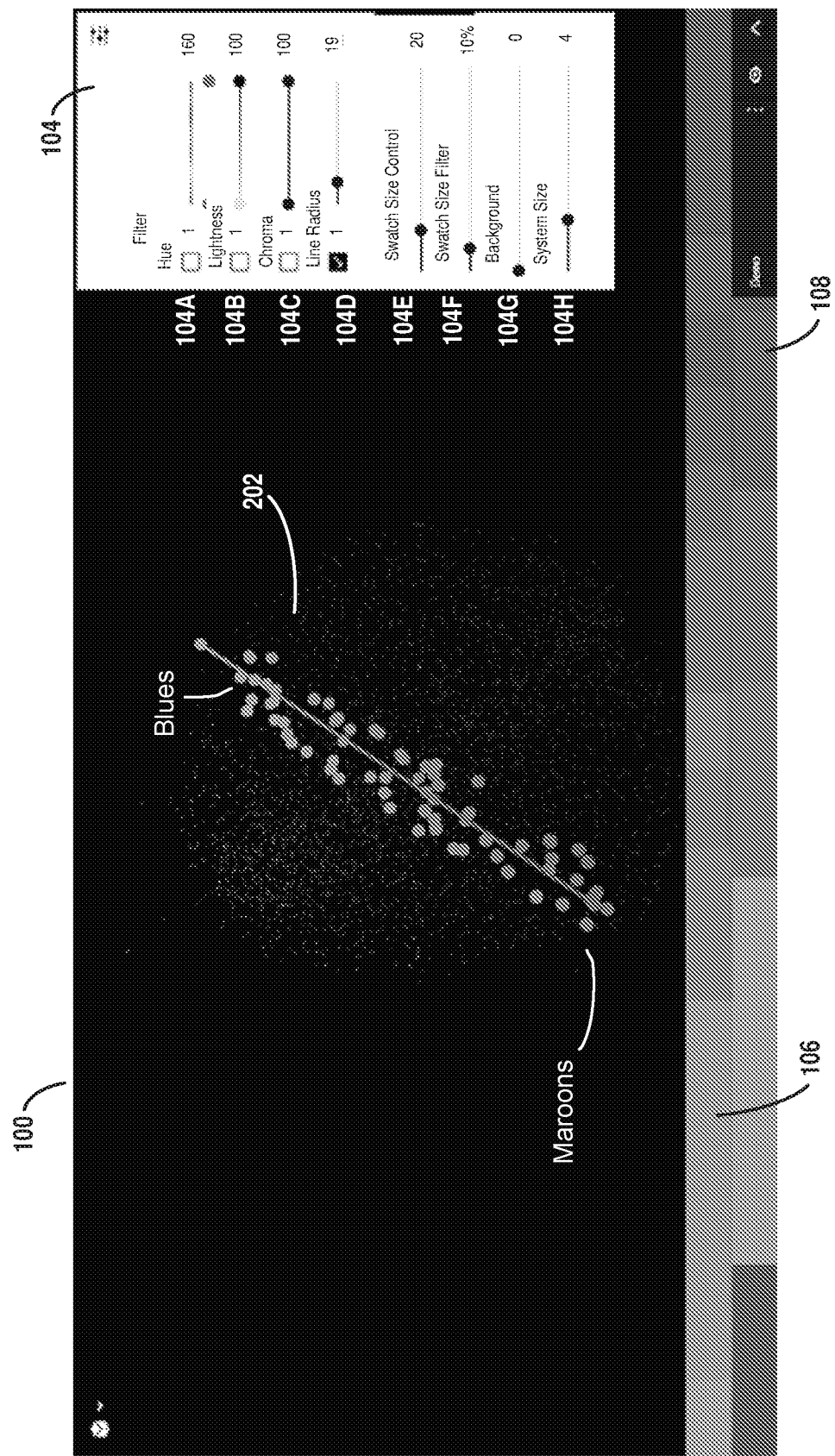
FIG. 2 illustrates a color tool involving a 3D color model, in accordance with example embodiments.

FIG. 2 depicts a color tool involving a 3D color model. The graphical user interface 100 may include a color cylinder 202. As stated previously, a user may select two unique points from the color model 102 in FIG. 1 to create a color line, as depicted in FIG. 2. Color cylinder 202 is a representation of harmonious colors that lie within a radius of the line between the two selected colors (for example, between a blue and a red color). As with color model 102 depicted in FIG. 1, color cylinder 202 is rotatable about the hue, lightness, and chroma axes. Color cylinder 202 may be controlled by the user via line radius filter 104*d*.

For example, color cylinder 202 may have a line radius of 19 out of 100, which represents harmonious colors closely associated with the two user-selected points. However, the user may desire to view colors more loosely associated with the two user-selected points. In this case, the user may increase the value of line radius filter 104*d* to 55 out of 100. The effect of this increase can be seen in FIG. 3.

Figure 3:
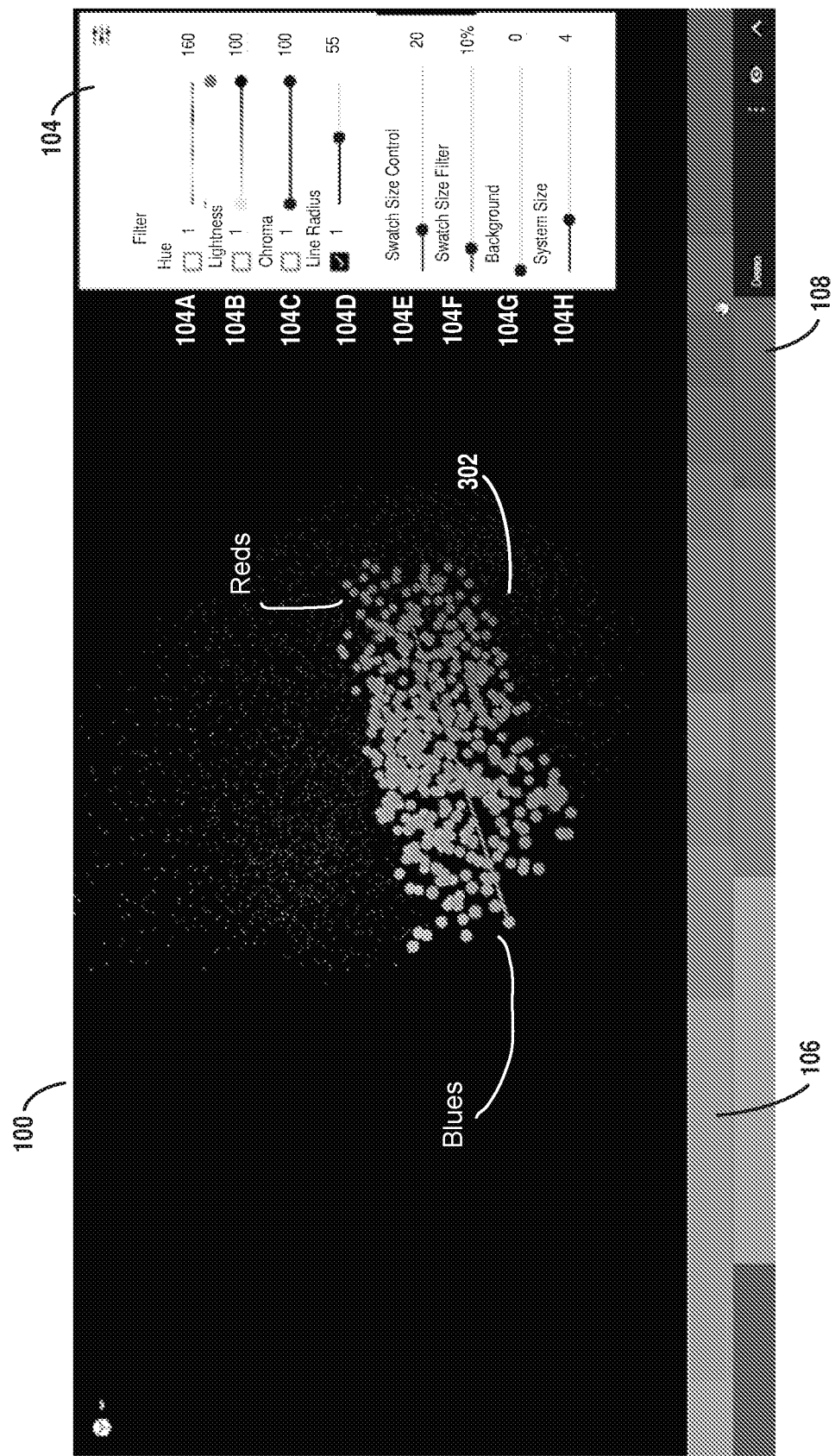
FIG. 3 illustrates a color tool involving a 3D color model, in accordance with example embodiments.

FIG. 3 illustrates a color tool involving a 3D color model, in which the radius of color cylinder 202 depicted in FIG. 2 is increased to 55 out of 100, resulting in color cylinder 302. Color cylinder 302 represents the same harmonious colors between the two user-selected points, but shows more of them due to the increased radius. The wider radius of color cylinder 302 causes the representation of colors in graphical user interface 100 to appear cylindrical.

Figure 4:
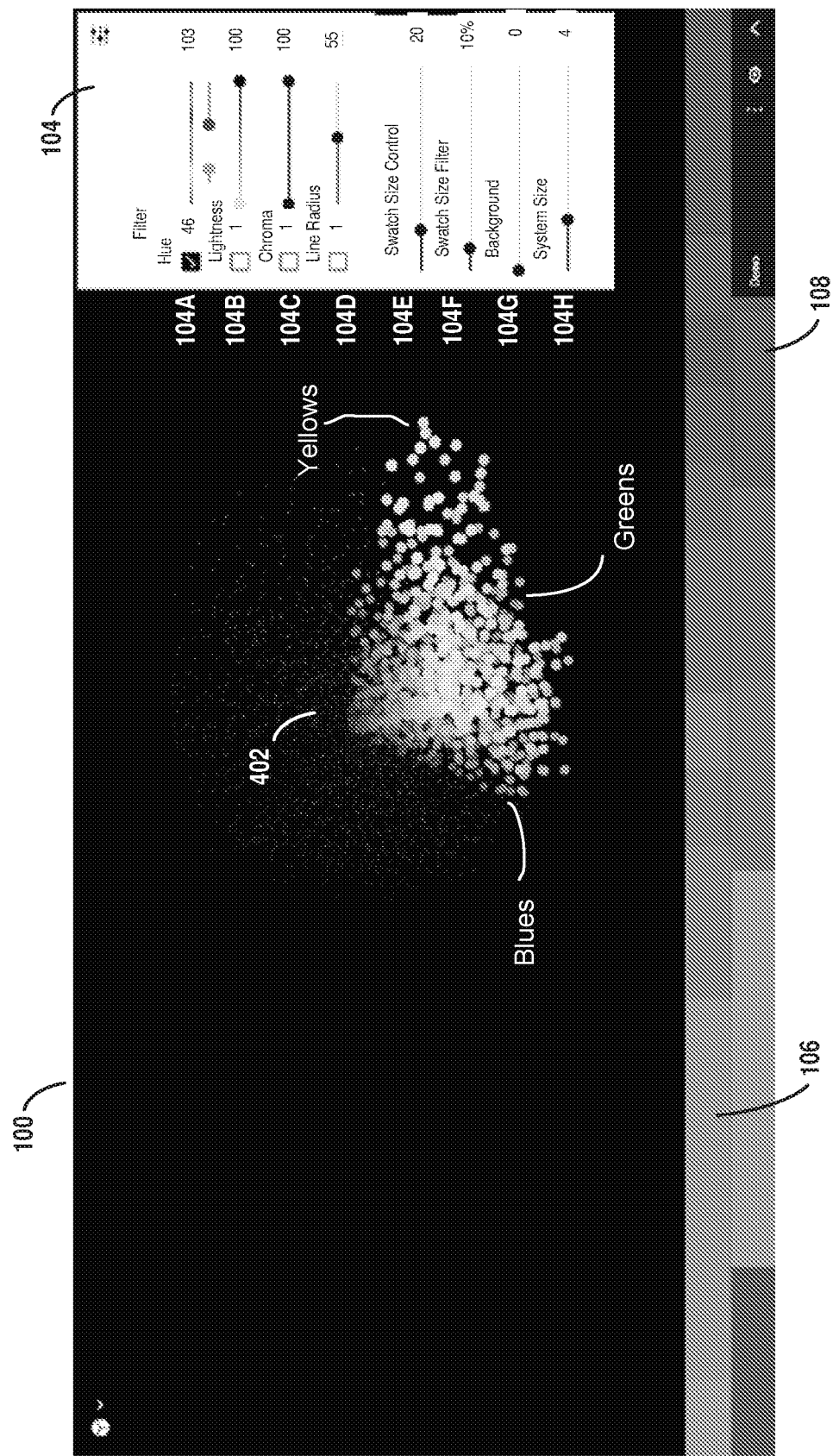
FIG. 4 illustrates a color tool involving a 3D color model, in accordance with example embodiments.

FIG. 4 illustrates a color tool involving a 3D color model, in which the 3D color model is adjusted by hue filter 104*a*. As stated previously, a user can set a range of hues via hue filter 104*a*, which filters the 3D color model to a smaller subset of colors. In FIG. 4, the user may set the range of hues in hue filter 104*a* to hues between 46 and 103. These hues represent the colors of yellow to light blue. Accordingly, graphical user interface 100 may display color model 402, depicting only a portion of the overall 3D color model. This may be beneficial to a user because it allows the user to drill down to the desired color set without having to rotate the model to avoid unwanted colors. While adjusting hue filter 104*a* may limit the distinct points for a user to choose from, the omitted points may still be represented as dimmed background elements. This may allow a user to see where the portion he or she has specified is located on the overall 3D color model.

Turning back to the personal website example, if the user already decided to use a blue and yellow theme, then the user can set hue filter 104*a* to the values shown in FIG. 4. From there, the user may select two unique points from color model 402 to begin building his or her preferred color palette 108.

Turning back to FIG. 2, adjusting hue filter 104*a* has an added effect when color line 202 is created. Specifically, color line 202 may be limited to colors in the hue range specified. For example, if the user changed hue filter 104*a* to reflect values between 140 and 160, color line 202 might not display any of the shades of blue depicted in FIG. 2. This may be beneficial if a user desires to only see variations of maroon, without any blues. The represents another way to narrow down the field of colors when selecting color palette 108.

Figure 5:
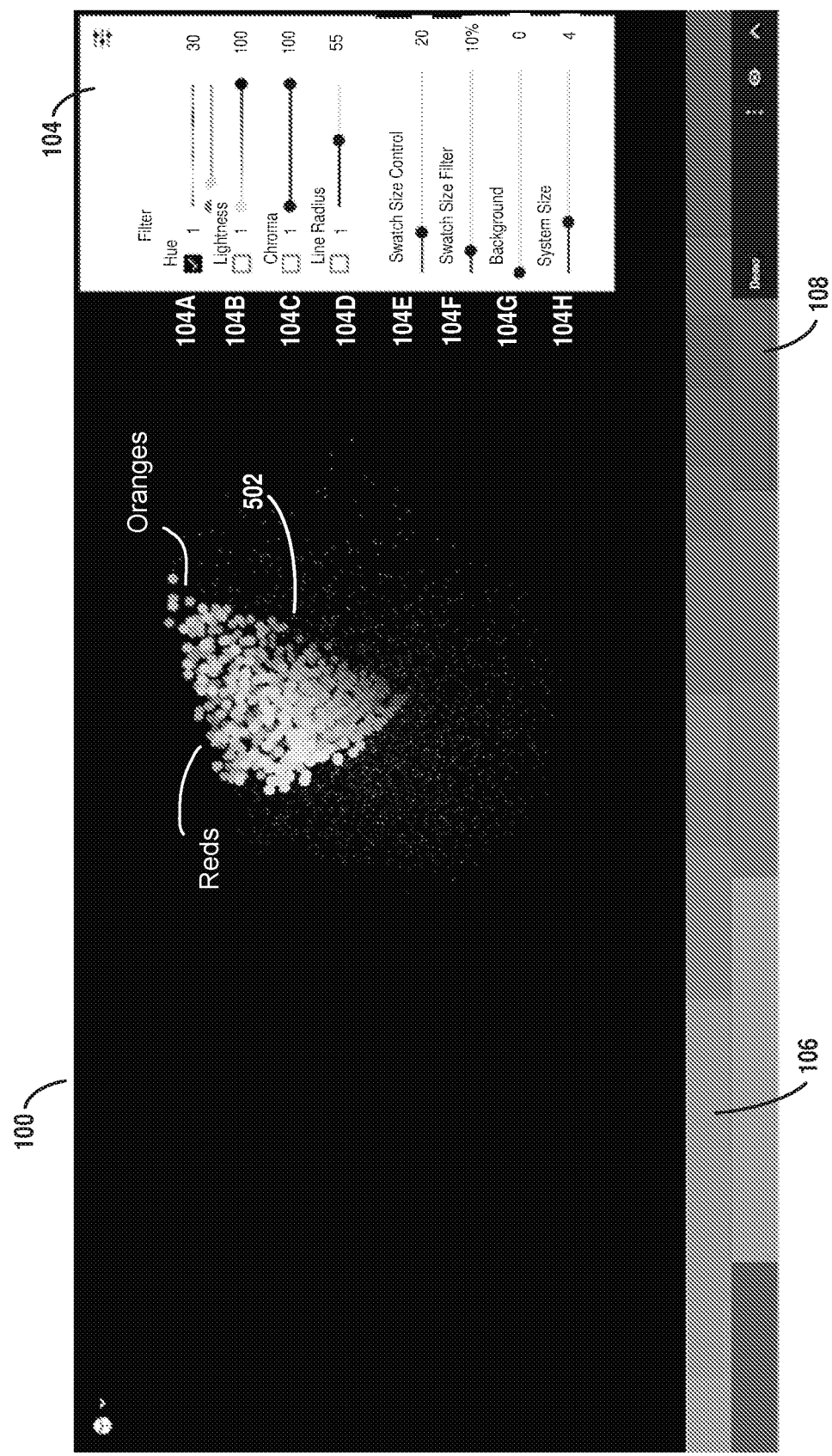
FIG. 5 illustrates a color tool involving a 3D color model, in accordance with example embodiments.

FIG. 5 illustrates a color tool involving a 3D color model, in which the 3D color model is adjusted by hue filter 104*a*. In FIG. 5, the user may have decided that a warmer theme is more appropriate for his or her website and thus he or she adjusted hue filter 104*a* to values of 1 and 30. The result may be a color range from red to orange. From this color range, the user may select two points to create a color line and see the harmonious colors that lie within the color range.

Figure 6:
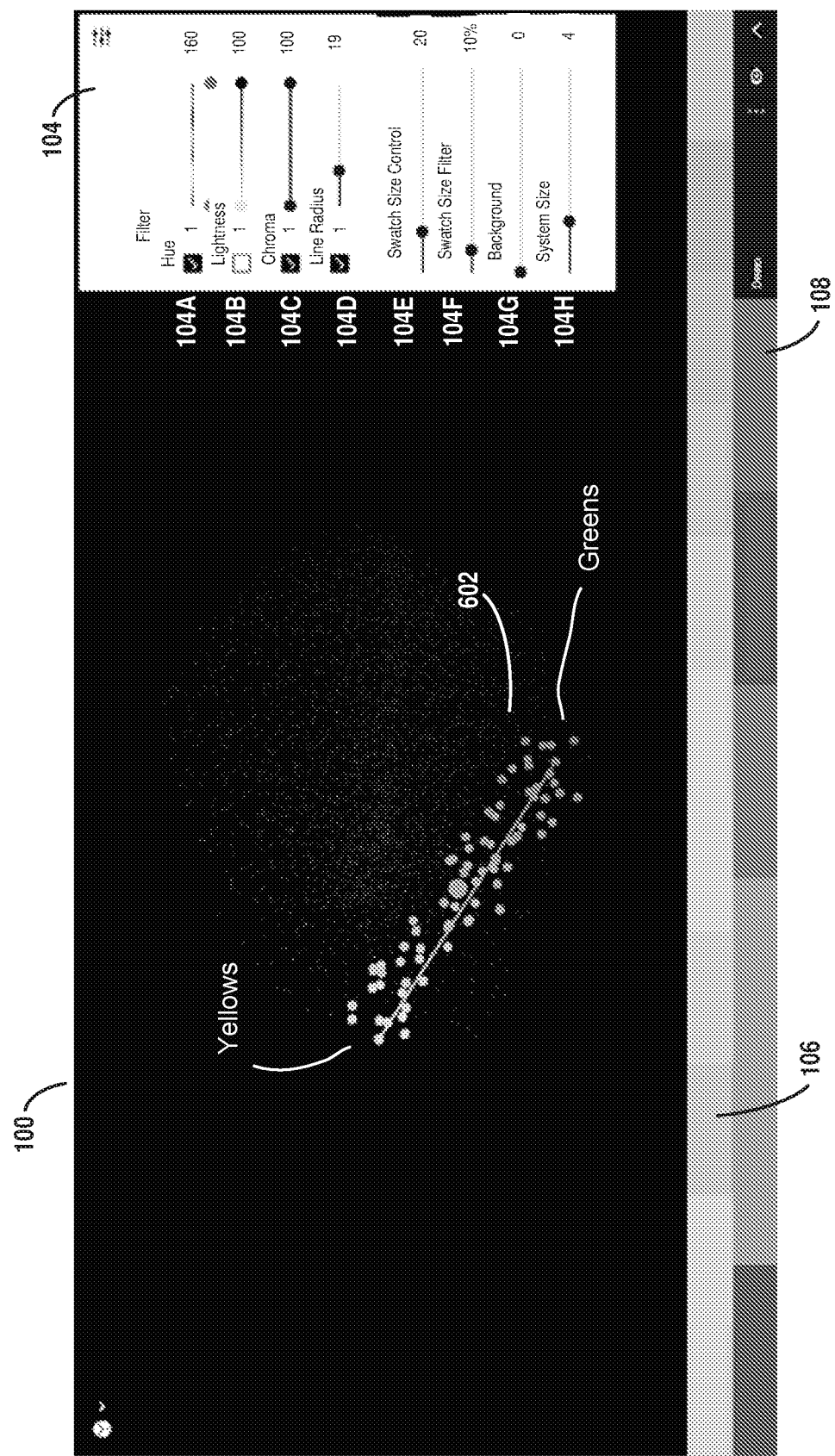
FIG. 6 illustrates a color tool involving a 3D color model, in accordance with example embodiments.

FIG. 6 illustrates a color tool involving a 3D color model, in which swatch bar 106 is customized based on the color line. In FIG. 6, a user may have created a color line 602 to represent distinct colors corresponding to the subset of unique points ranging from yellow to green. As shown, swatch bar 106 has automatically updated the distinct colors to correspond the selection of colors ranging from yellow to green. This automatic updating may be beneficial to the user because it allows the user to quickly select new colors to add to color palette 108.

IV. Example Operations

Figure 7:
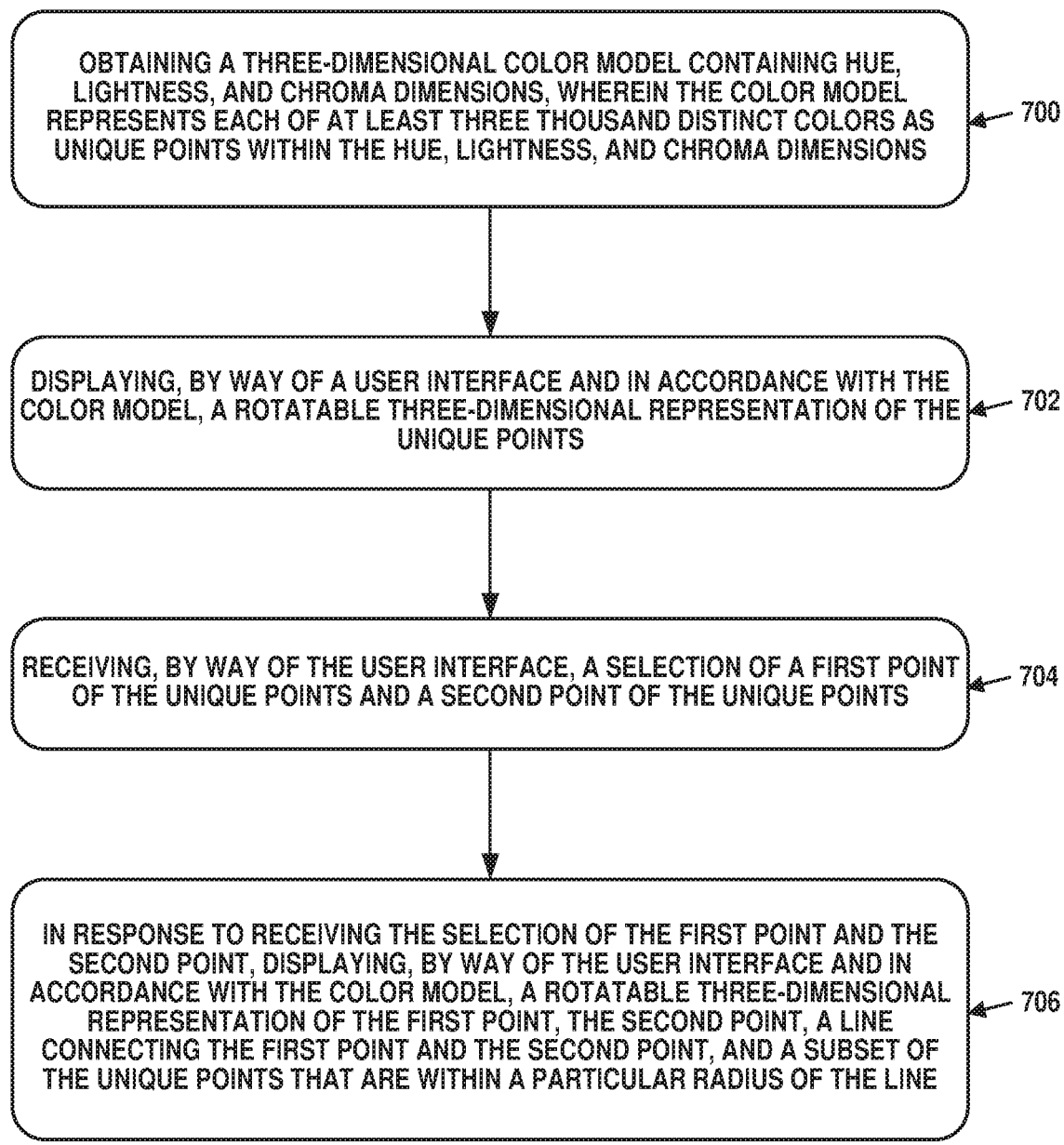
FIG. 7 is a flow chart, in accordance with example embodiments.

FIG. 7 is a flow chart illustrating an example embodiment. The process illustrated by FIG. 7 may be carried out by a computing device. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 may include obtaining a three-dimensional color model containing hue, lightness, and chroma dimensions. The color model may represent each of at least one thousand distinct colors as unique points within the hue, lightness, and chroma dimensions.

Block 702 may include displaying, by way of a user interface in accordance with the color model, a rotatable three-dimensional representation of the unique points.

Block 704 may include receiving, by way of the user interface, a selection of a first point of the unique points and a selection of a second point of the unique points.

Block 706 may include, in response to receiving the selection of the first point and the selection of the second point, displaying, by way of the user interface and in accordance with the color model, a rotatable three-dimensional representation of the first point, the second point, a line connecting the first point and the second point, and a subset of the unique points that are within a particular radius of the line.

Some embodiments may further involve displaying, by way of the user interface, a color palette containing a selection of the distinct colors associated with the first point, the second point, and the subset of the unique points. The color palette may be arranged according to an order of selection of the distinct colors associated with the first point, the second point, and the subset of the unique points.

In some embodiments, the rotatable three-dimensional representation of the unique points may be rotatable around respective axes associated with the hue, lightness, and chroma dimensions. The rotatable three-dimensional representation of the first point, the second point, the line, and the subset of the unique points may also be rotatable around respective axes associated with the hue, lightness, and chroma dimensions.

In some embodiments, the particular radius may be adjustable by way of the graphical user interface.

In some embodiments, the line and the particular radius may define a cylinder within which all of the subset of the unique points are disposed.

In some embodiments, ranges each of the hue, lightness, and chroma dimensions may be selectable by way of the graphical user interface. In these embodiments, displaying the rotatable three-dimensional representation of the unique points may include displaying only the unique points that fall within the ranges.

In some embodiments, the display of the rotatable three-dimensional representation of the first point, the second point, the line, and the subset of the unique points may omit any other unique points in the color model.

In some embodiments, the display of the rotatable three-dimensional representation of the first point, the second point, the line, and the subset of the unique points may include other unique points in the color model as dimmed background elements.

Some embodiments may further involve displaying, by way of the user interface, a swatch bar comprising containing a subset of the distinct colors associated with the first point, the second point, and the subset of the unique points. In these embodiments, an amount of the subset of distinct colors displayed in the swatch bar may be adjustable by way of the user interface. In these embodiments, the swatch bar may be linearly arranged according to positions of the distinct colors along the line. In these embodiments, a variance of the subset of colors displayed in the swatch bar may be adjustable by way of the user interface.

V. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The invention claimed is:

1. A computing device including a processor, memory, and a display, wherein the display is configured to represent a graphical user interface, and wherein the processor is configured to execute program instructions stored in the memory to perform operations comprising:
   obtaining a three-dimensional color model containing hue, lightness, and chroma dimensions, wherein the color model represents each of at least three thousand distinct colors as unique points within the hue, lightness, and chroma dimensions;
   displaying, by way of the user interface and in accordance with the color model, a rotatable three-dimensional representation of the unique points;
   receiving, by way of the user interface, a selection of a first point of the unique points and a selection of a second point of the unique points; and
   in response to receiving the selection of the first point and the selection of the second point, displaying, by way of the user interface and in accordance with the color model, a rotatable three-dimensional representation of the first point, the second point, a line connecting the first point and the second point, and a subset of the unique points that are within a particular radius of the line.

2. The computing device of claim 1, the operations further comprising: displaying, by way of the user interface, a color palette containing a selection of the distinct colors associated with the first point, the second point, and the subset of the unique points.

3. The computing device of claim 2, wherein the color palette is arranged according to an order of selection of the distinct colors associated with the first point, the second point, and the subset of the unique points.

4. The computing device of claim 1, wherein the rotatable three-dimensional representation of the unique points is rotatable around respective axes associated with the hue, lightness, and chroma dimensions, and wherein the rotatable three-dimensional representation of the first point, the second point, the line, and the subset of the unique points is rotatable around respective axes associated with the hue, lightness, and chroma dimensions.

5. The computing device of claim 1, wherein the particular radius is adjustable by way of the graphical user interface.

6. The computing device of claim 1, wherein the line and the particular radius define a cylinder within which all of the subset of the unique points are disposed.

7. The computing device of claim 1, wherein ranges each of the hue, lightness, and chroma dimensions are selectable by way of the graphical user interface, and wherein displaying the rotatable three-dimensional representation of the unique points comprises displaying only the unique points that fall within the ranges.

8. The computing device of claim 1, wherein the display of the rotatable three-dimensional representation of the first point, the second point, the line, and the subset of the unique points omits any other unique points in the color model.

9. The computing device of claim 1, wherein the display of the rotatable three-dimensional representation of the first point, the second point, the line, and the subset of the unique points includes other unique points in the color model as dimmed background elements.

10. The computing device of claim 1, the operations further comprising: displaying, by way of the user interface, a swatch bar containing a subset of the distinct colors associated with the first point, the second point, and the subset of the unique points.

11. The computing device of claim 10, wherein an amount of the subset of distinct colors displayed in the swatch bar is adjustable by way of the user interface.

12. The computing device of claim 10, wherein the swatch bar is linearly arranged according to positions of the distinct colors along the line.

13. The computing device of claim 10, wherein a variance of the subset of colors displayed in the swatch bar is adjustable by way of the user interface.

14. A non-transitory computer-readable medium containing program instructions that, when executed by a processor, cause a computing device to perform the operations of claim 1.

15. A method comprising the operations of claim 1.

* * * * *